(12) United States Patent
Stöckl et al.

(10) Patent No.: US 7,717,247 B2
(45) Date of Patent: May 18, 2010

(54) SYNCHRONIZATION DEVICE FOR A CHANGE SPEED GEAR

(75) Inventors: Friedrich Stöckl, Vorchdorf (AT); Karl Ammer, Vorchdorf (AT); Günter Nelböck, Seewalchen (AT)

(73) Assignee: Miba Sinter Austria GmbH, Laakirchen (AU)

( * ) Notice: Subject to any disclaimer, the term of this patent is extended or adjusted under 35 U.S.C. 154(b) by 682 days.

(21) Appl. No.: 10/586,242

(22) PCT Filed: Jan. 14, 2005

(86) PCT No.: PCT/AT2005/000005

§ 371 (c)(1), (2), (4) Date: Mar. 28, 2007

(87) PCT Pub. No.: WO2005/068866

PCT Pub. Date: Jul. 28, 2005

(65) Prior Publication Data

US 2008/0017470 A1 Jan. 24, 2008

(30) Foreign Application Priority Data

Jan. 15, 2004 (AT) .................................. A 43/2004

(51) Int. Cl.
*F16D 23/06* (2006.01)
(52) U.S. Cl. ..................... 192/53.34; 192/53.32; 74/339
(58) Field of Classification Search .............. 192/53.32, 192/53.34; 74/339; *F16D 0023/06*
See application file for complete search history.

(56) References Cited

U.S. PATENT DOCUMENTS 2,380,559 A * 7/1945 Tyken ..................... 192/53.34
3,678,557 A * 7/1972 Howard .................... 29/893.37
4,267,912 A * 5/1981 Bauer et al. .............. 192/53.34
4,494,638 A * 1/1985 Zenker .................... 192/48.91
5,135,087 A * 8/1992 Frost ....................... 192/53.31
5,657,844 A * 8/1997 Wagner .................... 192/53.32
7,134,537 B2 * 11/2006 Schwuger et al. ......... 192/53.34

(Continued)

FOREIGN PATENT DOCUMENTS

DE 42 24 271 A1 1/1994

(Continued)

OTHER PUBLICATIONS

International Search Report.

*Primary Examiner*—David D Le
*Assistant Examiner*—Terry Chau
(74) *Attorney, Agent, or Firm*—Collard & Roe, P.C.

(57) ABSTRACT

A synchronization device is described for a change speed gear, comprising at least one cone clutch which comprises a double cone ring (10) which is freely rotatable relative to a hub (1) between an inner friction ring (8) and an outer synchronizing ring (9) which is axially displaceable relative to the friction ring (8) and which comprises a ring body (15) with a stop gearing (14) on the outer circumference and a friction surface (17) on the inner circumference as well as radially inwardly facing drivers (13) for the friction ring (8). In order to provide advantageous constructional conditions it is proposed that the drivers (13) are provided on a driver ring (16) made of at least one sheet-metal pre-cut part which is joined to the ring body (15) consisting of a sintered body.

3 Claims, 2 Drawing Sheets

U.S. PATENT DOCUMENTS

2004/0256190 A1* 12/2004 Schwuger ................ 192/53.34
2005/0016307 A1* 1/2005 Schwuger et al. ............. 74/339

FOREIGN PATENT DOCUMENTS

| DE | 197 18 905 A1 | 11/1998 |
| DE | 101 63 828 A1 | 7/2003 |
| EP | 1 312 823 A | 5/2003 |

* cited by examiner

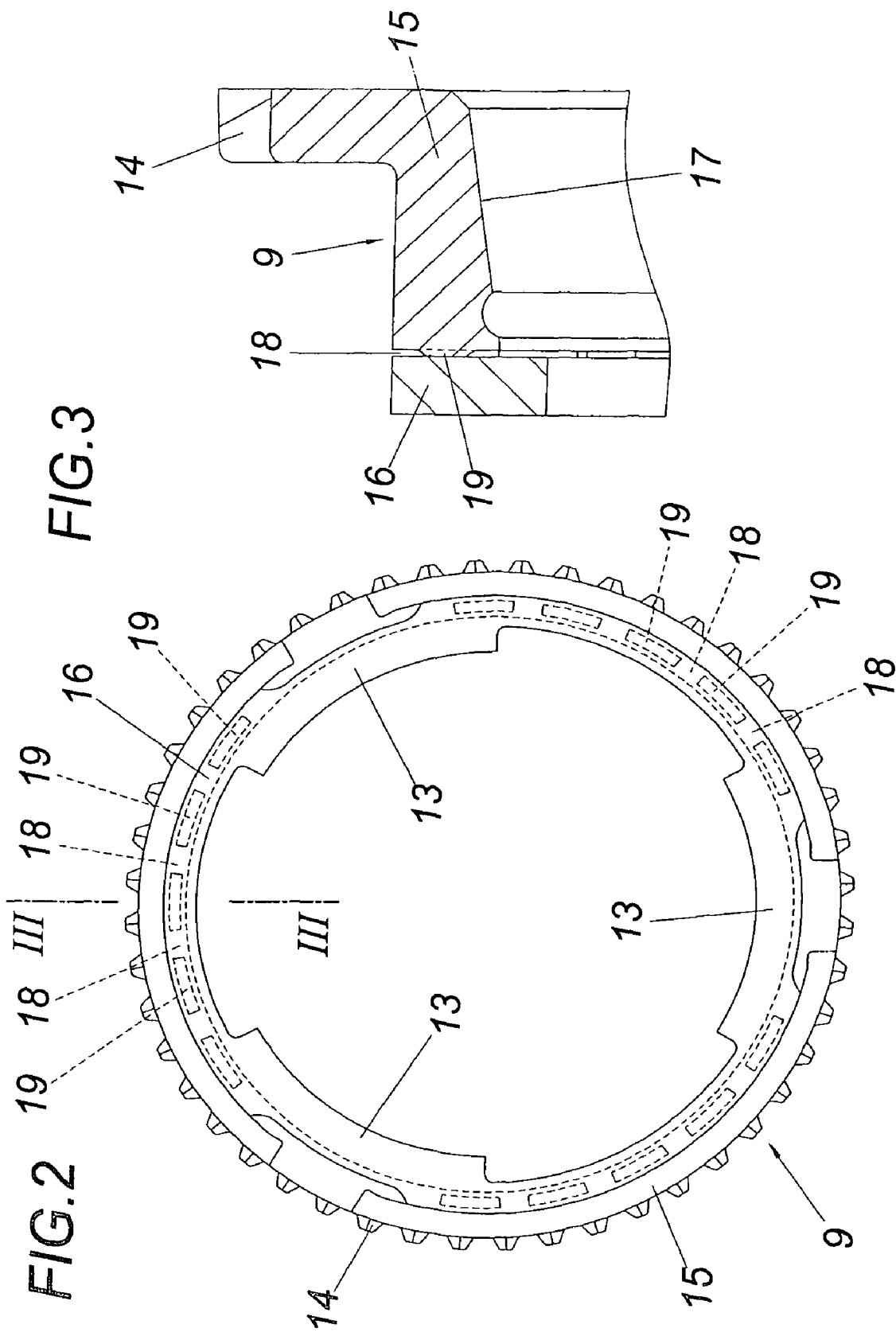

SYNCHRONIZATION DEVICE FOR A CHANGE SPEED GEAR

CROSS REFERENCE TO RELATED APPLICATIONS

Applicants claim priority under 35 U.S.C. §119 of Austrian Application No. A 43/2004 filed Jan. 15, 2004. Applicants also claim priority under 35 U.S.C. §365 of PCT/AT2005/000005 filed Jan. 14, 2005. The international application under PCT article 21(2) was not published in English.

FIELD OF THE INVENTION

The invention relates to a synchronization device for a change speed gear, comprising at least one cone clutch which comprises a double cone ring which is freely rotatable relative to a hub between an inner friction ring and an outer synchronizing ring which is axially displaceable relative to the friction ring and which comprises a ring body with a stop gearing on the outer circumference and a friction surface on the inner circumference as well as radially inwardly facing drivers for the friction ring.

DESCRIPTION OF THE PRIOR ART

In a change speed gear with a hub which is seated in a torsionally rigid manner on a shaft and a gearwheel which is held in a freely rotating fashion on the shaft, it is known (DE 42 24 271 A1) to provide a synchronization device with a cone clutch between the hub and the gearwheel which comprises a double cone ring producing a rotating entrainment of the gearwheel and which is clamped in a non-positive way between an inner friction ring and a synchronizing ring which is associated with the hub and is axially adjustable relative to said friction ring by the sliding collar. If the sliding collar on the hub is displaced within the scope of a clutching engagement, the double cone ring is accelerated to the circumferential speed of the hub by the axial entrainment of the synchronizing ring in a frictionally engaged manner between the inner friction ring and the outer synchronizing ring. This acceleration also applies to the gearwheel torsionally rigidly joined to the double cone ring and which therefore allows the subsequent unhindered clutch engagement between the sliding collar and the crown of claws. A stop gearing is arranged on the synchronizing ring and cooperates with the claws of the sliding collar to prevent the sliding collar from performing the axial clutching movement during the synchronization.

For the purpose of the rotation entrainment of the friction ring by the synchronizing ring, the same comprises inwardly facing drivers which are supported in a torsionally rigid, but axially displaceable way relative to the friction ring. The drivers are therefore subjected to stresses which place certain requirements on the properties of the materials, since due to the lack of available space the drivers may only have comparatively low wall thicknesses. For this reason a production of the synchronizing rings on the basis of powder metallurgy is not possible although such a production on the basis of powder metallurgy would offer considerable production benefits. An additional factor is that the drivers obstruct the displacement of oil from the gaps between the double cone ring on the one hand and the friction surface of the synchronizing ring and the friction ring on the other hand.

SUMMARY OF THE INVENTION

The invention is thus based on the object of providing a synchronizing device of the kind mentioned above in such a way that simple production conditions can be ensured without needing to fear any excessive stress on the constructional parts.

This object is achieved by the invention in such a way that the drivers are provided on a driver ring made of at least one sheet-metal pre-cut part which is joined to the ring body consisting of a sintered body.

Since the drivers of the synchronizing ring are provided on a driver ring which is separate from its ring body, the simple precondition is created to produce the ring body on the basis of powder metallurgy as a sintered body without having to fear any excess stress of the drivers which are provided on a driver ring made from at least one sheet-metal blank. It is therefore merely necessary to join the driver ring and the ring body with each other after their separate production. A special joining technique is irrelevant as long as a respective transmission of force between ring body and driver ring is ensured.

The allocation of the drivers to a separate driver ring also allows leaving open radial gaps between the driver ring and the ring body, which gaps are distributed over the circumference and which facilitate the oil displacement between the friction ring and double cone or friction ring and synchronizing ring on the side of the drivers and lead to an improved cooling through the oil flow between said gaps.

In order to predetermine a certain gap width from a constructional viewpoint, the ring body or the driver ring can be provided with connection noses determining the gap width which are not only used as connection surfaces but also as spacers.

It was surprisingly noticed that even comparatively small gap widths lead to a marked improvement in the oil displacement. It is therefore possible under certain circumstances to omit separate connection noses if the gap width corresponds to the thickness of a bonding layer such as an adhesive or soldering layer which is merely provided in circumferential sections.

BRIEF DESCRIPTION OF THE DRAWINGS

The subject matter of the invention is shown in an exemplary manner in the drawings, wherein:

FIG. 2 shows the synchronizing ring of the cone clutch of said synchronization device in a face view of the driver ring, and FIG. 3 shows a sectional view along line III-III of FIG. 2 on an enlarged scale.

PREFERRED EMBODIMENTS OF THE INVENTION

Figure 1:
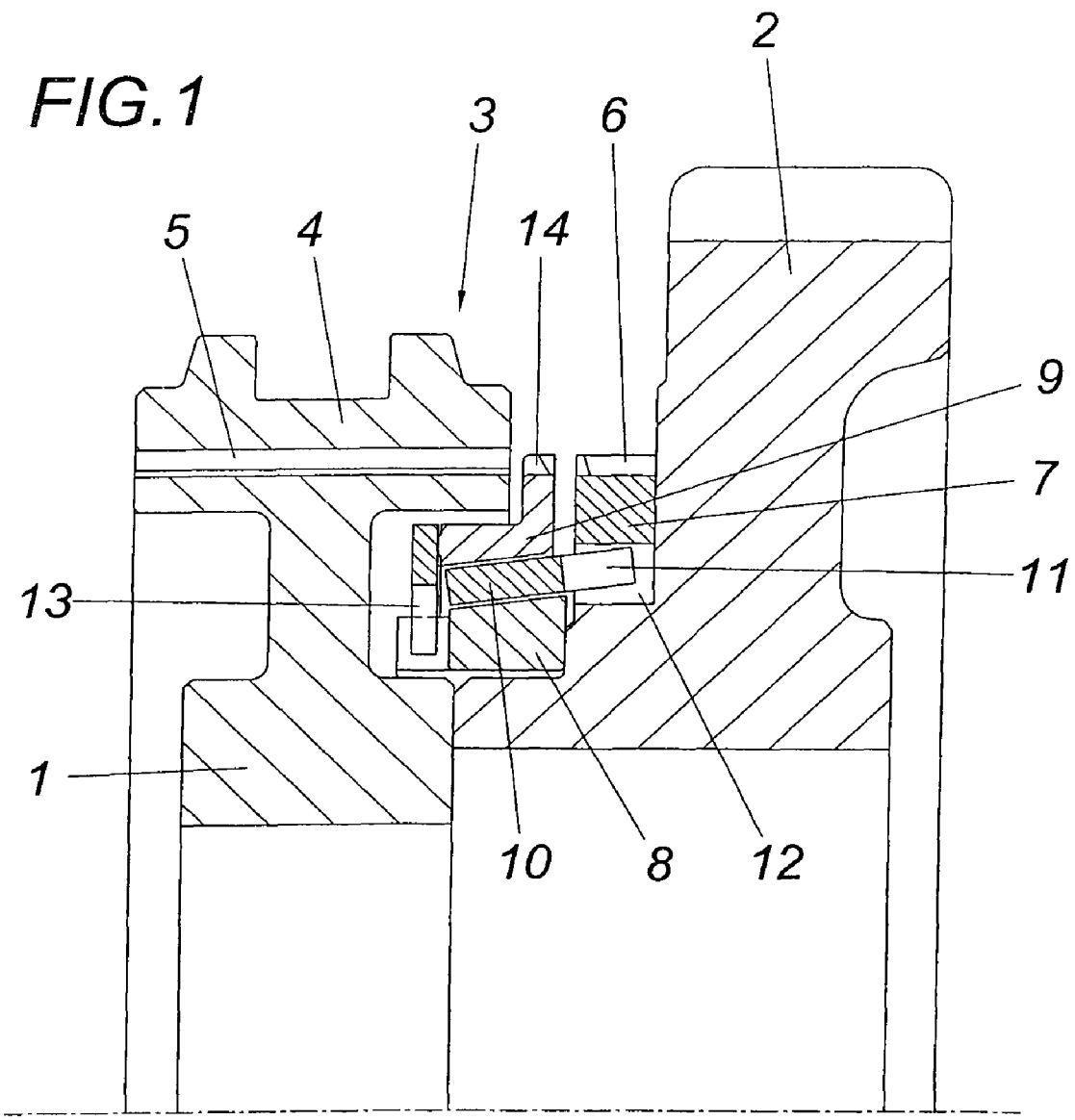
FIG. 1 shows sections of a synchronization device in accordance with the invention for a change speed gear in a simplified axial sectional view.

In accordance with FIG. 1, a claw clutch 3 is provided between a hub 1 which is seated in a torsionally rigid manner on a shaft and gearwheel 2 of a change speed gear, which gearwheel is held in a freely rotatable manner on said shaft, said claw clutch 3 comprising a sliding collar 4 which is held in an axially displaceable manner on the hub 1 and which cooperates with its inside claw gearing 5 with a claw ring 6 of a clutch body 7 of the gearwheel 2. In order to enable actuating the claw clutch 3 only when the speed of hub 1 corresponds to that of the gearwheel 2, a synchronization device is provided which comprises an inner friction ring 8, an outer synchronizing ring 9 and a double-cone ring 10. Whereas the friction and synchronizing rings 8, 9 are associated with the hub 1, the double-cone ring 10 is torsionally rigidly connected with the gearwheel 2 via drivers 11 which engage into respective receivers 12 of the clutch body 7. The synchronizing ring 9 which forms a cone clutch with the friction ring 8 and the double-cone ring 10 is held in an axially displaceable manner relative to the friction ring 8 and is coupled with the friction ring 8 via drivers 13 for rotational entrainment.

In order to ensure that the sliding collar 4 can be brought into engagement with the claw ring 6 of the clutch body 7 only after a synchronization of the speeds of the hub 1 and the gearwheel 2, the synchronizing ring 9 which is rotatable within limits relative to the sliding collar 4 is provided with a stop gearing 14 which cooperates with the claw gearing 5 of the sliding collar 4. When the sliding collar 4 is displaced from its shown middle position against the gearwheel 2, pressure elements are axially pressed against the synchronizing ring 9, which pressure elements are distributed in a conventional manner over the circumference of the hub 1 and are coupled via a spring catch with the sliding collar 4, so that a frictionally engaged connection is produced between the synchronizing ring 9 and the friction ring 8 on the one hand and the double cone ring 10 on the other hand with the effect that differences in speed between the synchronizing ring 9 and the gearwheel 2 are compensated. Since in the case of this synchronization the face surfaces of the claw gearing 5 of the sliding collar 4 are pressed against the stop gearing 14, any access of the claw gearing 5 to the claw ring 6 of the clutch body 7 is blocked. Only after the reduction of the friction torque caused by the synchronization is it possible to use the torque caused by the roof slopes of the face surfaces of the claw gearing 5 resting on each other and the stop gearing 14 in cooperation with the axial controlling torque of the sliding collar 4 for mutual twisting of synchronizing ring 9 and sliding collar 4 in order to introduce the claw gearing 5 of sliding collar 4 past the stop gearing 14 of synchronizing ring 9 into the claw ring 6 of the clutch body 7.

As is shown in FIGS. 2 and 3, the synchronizing ring 9 is composed of a ring body 15 and a driver ring 16 forming the drivers 13. This separation between the ring body 15 and the drivers 13 which belong to a separate driver ring 16 advantageously allow producing the ring body 15 in a powder-metallurgical way as a sintered body, whereas the driver ring 16 with the drivers 13 consists of a sheet-metal cutting. The advantages of powder-metallurgical production of the ring body 15 can be used without having to fear any overloading of the drivers 13 which are joined into a driver ring 16 made of a sheet-metal cutting. It is merely necessary to ensure a respective connection between the ring body 15 and the driver ring 16, for which purpose it is possible to use both interlocking as well as firmly bonded connections. According to FIG. 3, the ring body 15 forms both the stop gearing 14 as well as the conical frictional surface 17 cooperating with the double cone 10. This is not mandatory however. The stop gearing 14 can be made as a separate gear ring from an embossed part of sheet metal and be joined with the ring body 15. The frictional surface 17 could consist of a frictional layer of different structure which is applied to the ring body 15.

The separate production of the ring body 15 and the driver ring 16 also forms an advantageous precondition for a simple configuration of radial gaps 18 between the driver ring 16 and the ring body 15.

This gap, which has a gap width of preferably between 0.2 and 1 mm, promotes the rapid displacement of oil from the gap area between the double cone ring 10 on the one hand and the friction ring 8 and the synchronizing ring 9 on the other hand. Moreover, improved cooling is obtained by the oil flow through the gap 18. The oil is displaced radially outwardly as a result of the centrifugal forces.

In order to predetermine a specific gap width in a constructional way, the ring body 15 in the embodiment comprises connecting noses 19 which project against the driver ring 16, which noses are used not only for connecting the ring body 15 and the driver ring 16, but also represent spacers, as is shown in FIG. 3. For small gap widths it may certainly be sufficient to use the bonding layer, e.g. a gluing or soldering layer, provided between the ring body 15 and the driver ring 16 as a spacer. It is obvious that the bonding layer may only be provided in circumferential areas in order to ensure the radial gap 18 between the areas of the bonding layer.

It is understood that the invention is not limited to the illustrated embodiment. The driver ring could also be composed of two or more pre-cut parts in a segment-like manner.

The invention claimed is:

1. A synchronization device for a change speed gear, comprising at least one cone clutch which comprises a double cone ring which is freely rotatable relative to a hub between an inner friction ring and an outer synchronizing ring which is axially displaceable relative to the friction ring and which comprises a ring body with a stop gearing on the outer circumference and a friction surface on the inner circumference as well as radially inwardly facing drivers for the friction ring, wherein the drivers are provided on a driver ring made of at least one sheet-metal pre-cut part which is joined to the ring body made of a sintered body, and wherein between the driver ring and the ring body are radial gaps distributed over the circumference.

2. The synchronization device according to claim 1, wherein the ring body or the driver ring comprises connecting noses determining gap widths of the radial gaps.

3. The synchronization device according to claim 2, wherein each gap width corresponds to a thickness of bonding layer provided in circumferential sections of the driver ring.

* * * * *

UNITED STATES PATENT AND TRADEMARK OFFICE
CERTIFICATE OF CORRECTION

PATENT NO. : 7,717,247 B2
APPLICATION NO. : 10/586242
DATED : May 18, 2010
INVENTOR(S) : Stöckl et al.

It is certified that error appears in the above-identified patent and that said Letters Patent is hereby corrected as shown below:

Title page, Item [73], please change the country of the Assignee from "(AU)" to correctly read:   -- (AT) --.

Signed and Sealed this

Thirteenth Day of July, 2010

David J. Kappos
*Director of the United States Patent and Trademark Office*